United States Patent
Schiaffino et al.

(10) Patent No.: US 6,188,815 B1
(45) Date of Patent: Feb. 13, 2001

(54) OPTICAL SWITCHING DEVICE AND METHOD UTILIZING FLUID PRESSURE CONTROL TO IMPROVE SWITCHING CHARACTERISTICS

(75) Inventors: Stefano Schiaffino, Menlo Park; Mark Troll, Palo Alto; Dale W. Schroeder, Scotts Valley, all of CA (US)

(73) Assignee: Agilent Technologies, Inc., Palo Alto, CA (US)

( * ) Notice: Under 35 U.S.C. 154(b), the term of this patent shall be extended for 0 days.

(21) Appl. No.: 09/348,979

(22) Filed: Jul. 7, 1999

(51) Int. Cl.[7] ........................................ G02B 6/35
(52) U.S. Cl. ................... 385/16; 385/17; 385/18
(58) Field of Search .................. 385/16, 17, 18

(56) References Cited

U.S. PATENT DOCUMENTS

| | | | |
|---|---|---|---|
| 4,121,884 | 10/1978 | Greenwood | 350/96.15 |
| 5,699,462 | 12/1997 | Fouquet et al. | 385/18 |
| 5,828,799 * | 10/1998 | Donald | 385/16 |
| 5,960,131 * | 9/1999 | Fouquet et al. | 385/17 |
| 6,055,344 * | 4/2000 | Fouquet et al. | 385/16 |

* cited by examiner

Primary Examiner—John D. Lee
Assistant Examiner—Jennifer Doan
(74) Attorney, Agent, or Firm—Ian Hardcastle

(57) ABSTRACT

A switching device includes a substrate, a first waveguide segment, a second waveguide segment, a heating device, a liquid, and a pressure controlling mechanism. The substrate is coupled to the first waveguide segment and the second waveguide segment, and the substrate includes a chamber that separates the first waveguide segment from the second waveguide segment. The liquid is disposed in the chamber and is responsive to the heating device. The pressure controlling mechanism controls a pressure in the chamber such that inadvertent bubbles are prevented from forming between the first waveguide segment and the second waveguide segment.

19 Claims, 6 Drawing Sheets

OPTICAL SWITCHING DEVICE AND METHOD UTILIZING FLUID PRESSURE CONTROL TO IMPROVE SWITCHING CHARACTERISTICS

BACKGROUND OF THE INVENTION

1. Field of the Invention

The present invention generally relates to optical switches and, in particular, to an optical switch based on total internal reflection that controls fluid pressure in the switch to improve switching characteristics.

2. Related Art

Some internally reflective optical switches change states by forming a bubble in a liquid that is located at the intersection of various waveguide segments. For example, U.S. Pat. No. 5,699,462 entitled "Total Internal Reflection Optical Switches Employing Thermal Activation," which is incorporated by reference, describes an optical switch that uses bubbles to change states.

As shown by FIG. 1, the switch 15 described by the foregoing patent has segments 22–25 of core material surrounded by cladding material 27. Segments 22 and 23 are separated from segments 24 and 25 by a trench 32, which is filled with a liquid 34 (FIG. 2). The index of refraction of the liquid 34 is close to or the same as the index of refraction of the segments 22–24. Therefore, in a first state of switch 15, an optical signal passing through segment 22 is not substantially reflected or refracted when it reaches the trench 32. Instead, the optical signal from segment 22 passes through the liquid 34 and then into segment 24.

The trench 32 also includes a heating device 35 (FIG. 2) located on a substrate 38 that may be used to switch the state of the switch 15. The heating device 35 includes control circuitry for selectively increasing or decreasing the amount of heat generated by the heating device 35. To switch the state of the switch 15, the temperature of the heating device 35 is increased until the temperature of the heating device 35 exceeds the boiling point of the liquid 34, thereby causing a bubble 41 to form in the liquid 34, as shown by FIG. 3. The bubble 41 has an index of refraction substantially different than the index of refraction for the liquid 34 and the segments 22–25, and the bubble 41 extends from segment 22 to segment 24. Therefore, an optical signal passing through segment 22 is reflected at the interface of the segment 22 and the bubble 41. Consequently, an optical signal transmitted by segment 22 is reflected at the boundary between the segment 22 and the bubble 41 and travels along segment 23 instead of segment 24.

To place the switch 15 back into its original state, the temperature of the heating device 35 is decreased until the bubble 41 collapses. In other words, the temperature of the heating device 35 is decreased to or below the boiling point of the liquid 34. Once the bubble 41 collapses, the optical signals traveling along segment 22 are no longer reflected at the end of segment 22, and the optical signals, therefore, pass into segment 24 instead of segment 23.

However, a problem with the switch 15 occurs when a bubble 42 (FIG. 4) inadvertently forms in the trench 32. Under certain conditions, an inadvertent bubble 42 forms in the trench 32 even though the heating device 35 is below the boiling point of the liquid 34. In this condition, signals traveling along segment 22 are reflected toward segment 23 regardless of the temperature of the heating device 35.

Thus, an unaddressed need exists in the industry for a device and method for controlling the formation of bubbles in optical switches such that the bubbles do not inadvertently form in the trench and disrupt the operation of the switch.

SUMMARY OF THE INVENTION

The present invention overcomes the inadequacies and deficiencies of the prior art as discussed above. Generally, the present invention provides a device and method for preventing switching errors caused by the inadvertent formation of bubbles in optical switches.

The present invention includes a substrate, a first waveguide segment, a second waveguide segment, a heating device, a liquid, and a pressure controlling mechanism. The substrate is coupled to the first waveguide segment and the second waveguide segment, and the substrate includes a chamber that separates the first waveguide segment from the second waveguide segment. The liquid is disposed in the chamber and is responsive to the heating device. The pressure controlling mechanism controls the pressure in the chamber such that inadvertent bubbles are prevented from forming between the first waveguide segment and the second waveguide segment.

In accordance with another feature of the present invention, the chamber is comprised of a first compartment and a second compartment. The two compartments are interconnected via a passageway extending from the first compartment to the second compartment. To control the pressure in the chamber, the pressure controlling mechanism controls the temperature of the liquid in the second compartment.

In accordance with another feature of the present invention, the pressure controlling mechanism is comprised of a piston and an actuator. To increase the pressure in the chamber, the actuator moves the piston in one direction, and to decrease the pressure in the chamber, the actuator moves the piston in the opposite direction.

In accordance with another feature of the present invention, the pressure controlling mechanism may inject and/or remove a substance into and/or out of the chamber to control the pressure in the chamber.

The present invention can also be viewed as providing a method for switching optical signals. The method includes the following steps: providing a first waveguide segment, a second waveguide segment, and a third waveguide segment; providing a substrate, the substrate including a chamber filled with a liquid, the chamber separating the first waveguide segment from the second waveguide segment; providing a heating device; transmitting an optical signal via the first optical waveguide segment; forming a bubble in the liquid by increasing the temperature of the heating device from a first temperature to a second temperature; and adjusting a pressure in the chamber such that optical signals transmitted via the first waveguide segment pass through the chamber and into the second waveguide segment when the temperature of the heating device is at the first temperature and such that optical signals transmitted via the first waveguide segment are reflected at a boundary of said bubble and are transmitted via the third waveguide segment when the temperature of the heating device is at the second temperature.

Other features and advantages of the present invention will become apparent to one skilled in the art upon examination of the following detailed description, when read in conjunction with the accompanying drawings. It is intended that all such features and advantages be included herein.

BRIEF DESCRIPTION OF THE DRAWINGS

The invention can be better understood with reference to the following drawings. The elements of the drawings are not necessarily to scale relative to each other, emphasis instead being placed upon clearly illustrating the present invention. Furthermore, like reference numerals designate corresponding parts throughout the several views.

DETAILED DESCRIPTION OF THE PREFERRED EMBODIMENT

Figure 4:
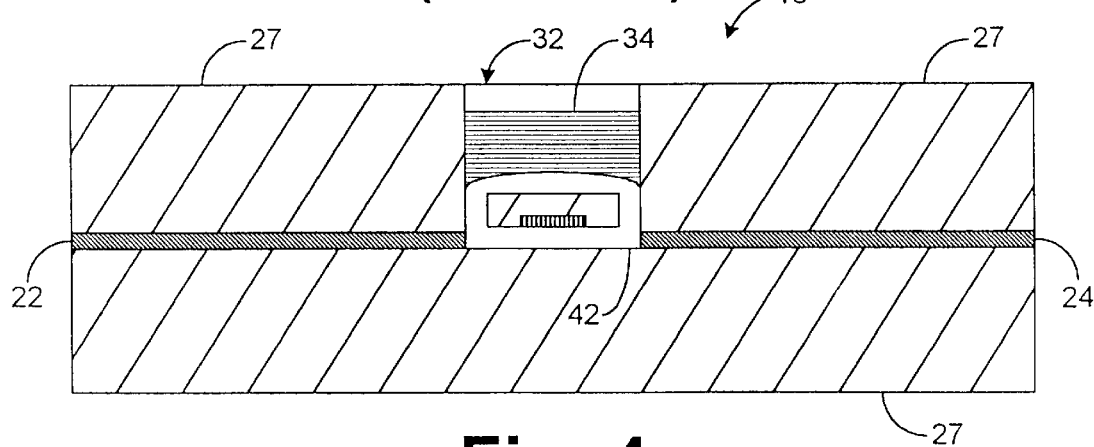
FIG. 4 is a cross-sectional view depicting the switch of FIG. 2 when a bubble has inadvertently formed in the liquid separating at least two waveguide segments.

The inventors have discovered that the formation of inadvertent bubbles 42 in the trench 32 of an internally reflective optical switch 15, as described in the Background section and FIG. 4, is usually induced by heat spreading through the substrate 38 from the heating device 35. In this regard, the temperature of the substrate 38 often gradually increases as the heating device 35 repeatedly generates heat. When the switch 15 is one of an array of similar switches, heat generated by nearby heating devices associated with the other switches can also gradually increase the temperature of the substrate 38.

As a result, the substrate 38 can become sufficiently hot to induce the formation of an inadvertent bubble 42 in the trench 32, as shown by FIG. 4. In other words, the temperature of the substrate 38 at various locations may exceed the boiling point of the liquid 34, thereby inducing the formation of an inadvertent bubble 42 in the liquid 34. This bubble 42 places the switch 15 in a reflective state regardless of the state (i.e., the temperature) of the heating device 35. Moreover, as long as the temperature of the substrate 38 induces an inadvertent bubble 42 of sufficient size to reflect the optical signals transmitted by segment 22, each signal transmitted by the segment 22 is reflected down segment 23, and controlling the temperature of the heating device 35 is ineffective in controlling the state of the switch 15.

Figure 1:
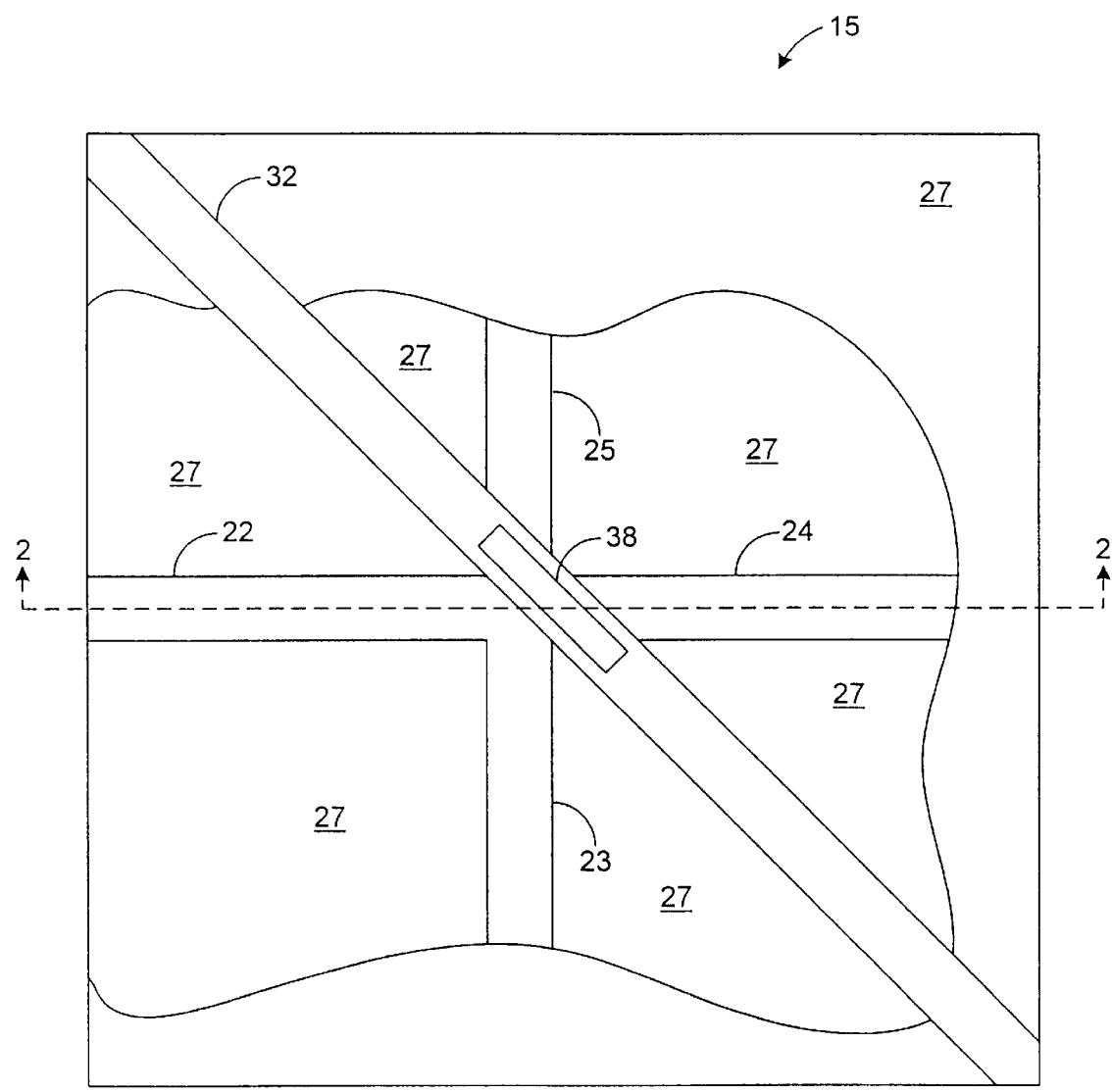
FIG. 1 is a top view of a conventional optical switch.
Figure 2:
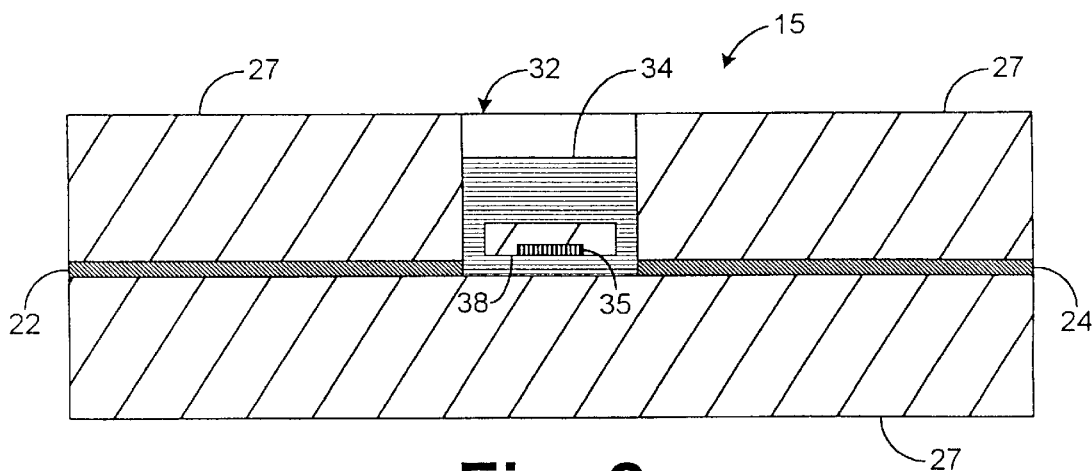
FIG. 2 is a cross-sectional view of the switch depicted by FIG. 1.
Figure 3:
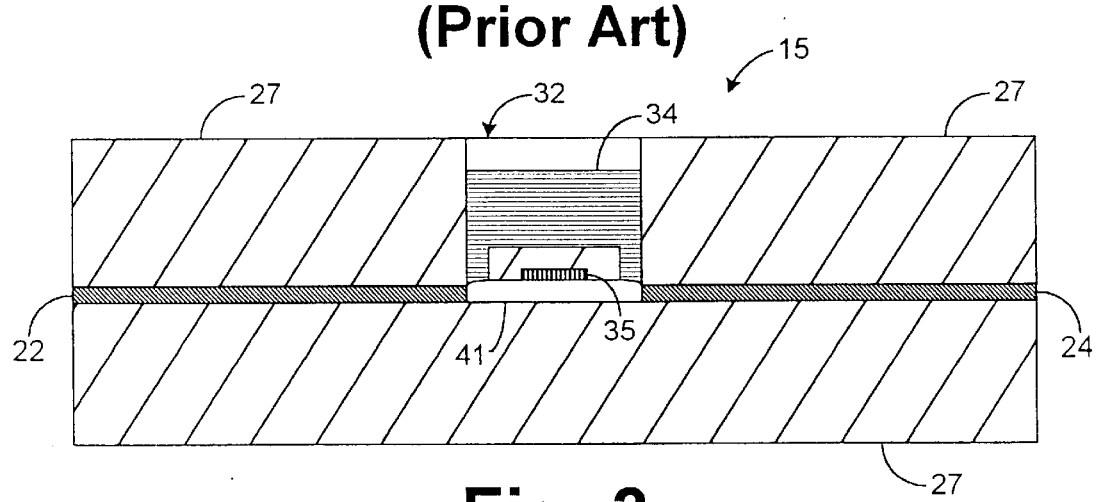
FIG. 3 is a cross-sectional view depicting the switch of FIG. 2 when a bubble has properly formed in the liquid separating at least two waveguide segments.

In general, the invention provides an improved optical switch 50 (FIG. 5) similar to the conventional switch 15 depicted by FIGS. 1–3. However, unlike conventional switch 15, the switch 50 of the present invention includes a pressure controlling mechanism 52 (FIG. 6) that controls the pressure applied to the liquid 34. The pressure controlling mechanism 52 maintains this pressure at a sufficiently high level such that heat from the substrate 38 does not induce inadvertent bubble formation in the liquid 34. Therefore, the switching characteristics of the switch 50 are not significantly affected by the temperature of the substrate 38.

Figure 5:
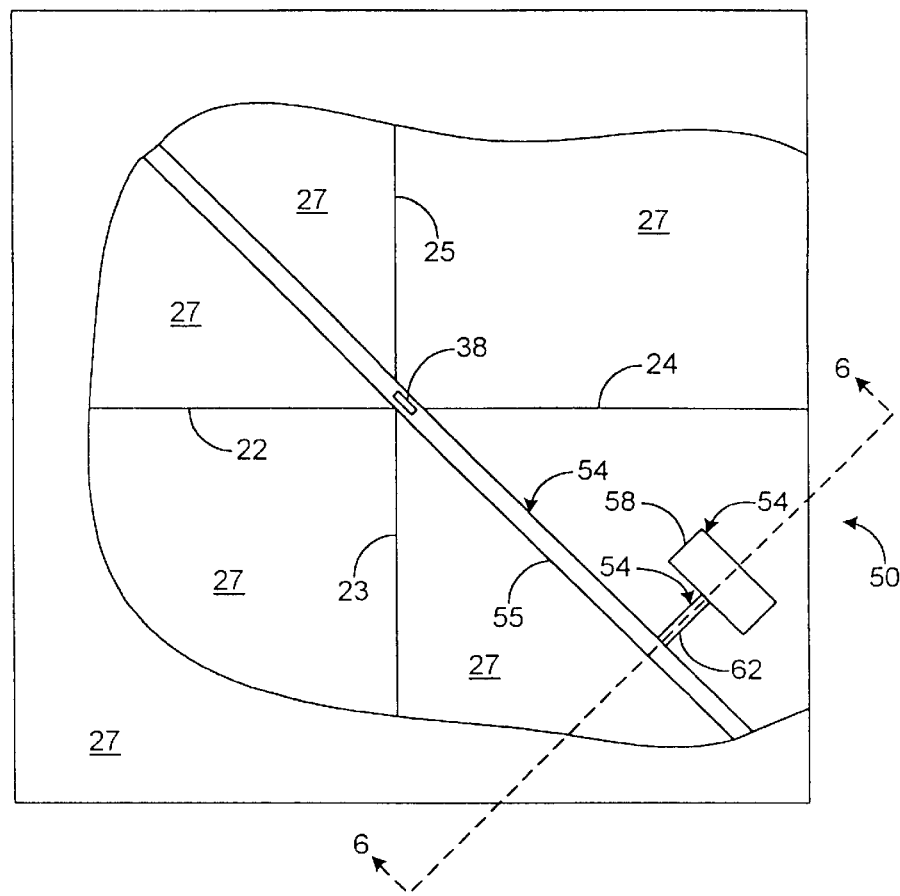
FIG. 5 is a top view of an optical switch of the present invention.
Figure 6:
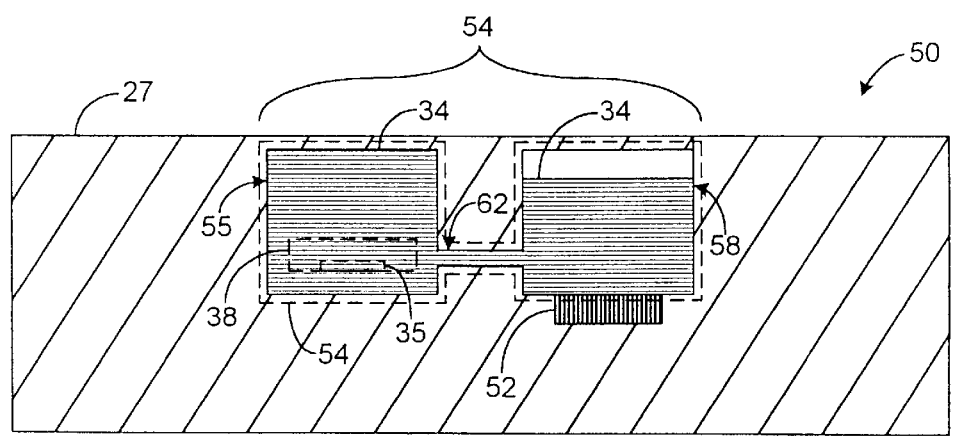
FIG. 6 is a cross-sectional view of the switch depicted by FIG. 5.

Referring to FIGS. 5 and 6, the cladding material 27 of switch 50 forms a substrate to which the waveguide segments 22–25 are coupled. The substrate of cladding material 27 includes a chamber 54 that separates waveguide segments 22 and 23 from waveguide segments 24 and 25, respectively. The chamber 54 is filled with a liquid 34, and it is preferable for the chamber 54 to be hermetically sealed and for the liquid 34 to be degassed, although liquids 34 that have not been degassed can also be used. Located in the chamber 54 is a substrate 38 to which a heating device 35 is coupled.

In a first state of switch 50, the temperature of the heating device 35 is at a first temperature, which is at or below the boiling point of the liquid 34. Therefore, no bubble exists in the liquid 34 between waveguide segments 22 and 24. The index of refraction of the liquid 34 should be matched sufficiently well to the index of refraction of the waveguide segments 22–25 that light passes into and through the liquid 34 without significantly changing direction. Therefore, in the first state of switch 50, the optical signal input to the switch 50 via segment 22 passes through the liquid 34 and into segment 24.

In a second state of switch 50, the temperature of the heating device 35 is increased to a second temperature, which is above the boiling point of the liquid 34. In this state, the heat from the heating device 35 causes a bubble 41 to form in the liquid 34, as shown in FIG. 3. The bubble 41 preferably extends from the end of segment 22 to the end of segment 24. Therefore, an optical signal input to the switch 50 via segment 22 is reflected at the interface of segment 22 and bubble 41 and passes out of the switch 50 via segment 23.

As shown by FIG. 6, the switch 50 includes a pressure controlling mechanism 52 that controls the pressure in chamber 54. The pressure controlling mechanism 52 maintains the pressure in chamber 54 in a range that prevents inadvertent bubble formation but allows the heat from heating device 35 to form a bubble 41 in chamber 54 when the switch 50 is in its second state.

In this regard, as the pressure in the chamber 54 increases, the boiling point of the liquid 34 increases, and as the pressure in the chamber 54 decreases, the boiling point of the liquid 34 decreases. Furthermore, the temperature of the substrate 38 should be consistently less than the above-mentioned second temperature, since the heating of the substrate 38 is principally caused by the heating of the heating device 35 to the second temperature or the heating of nearby similar heating devices to the second temperature.

Since the boiling point of the liquid 34 changes with the pressure in the chamber 54 and since the temperature of the substrate 38 should be consistently less than the second temperature, there is a range of pressures in the chamber 54 that sets the boiling point of the liquid 34 to a temperature in the range between the temperature of the substrate 38 and the second temperature. As long as the pressure in the chamber 54 is maintained in this pressure range, the pressure prevents the heat from the substrate 38 from inducing the formation of an inadvertent bubble 42 in the liquid 34 and allows a bubble 41 to form in the liquid 34 solely in response to the heat from the heating device 35.

However, if the pressure in the chamber 54 is below the minimum of this above-mentioned pressure range, then the heat from the substrate 38 may cause an inadvertent bubble 42 to form in the liquid 34. This inadvertently places the switch 50 into a reflective state (i.e., into its second state). If the pressure in the chamber 54 is higher than this above-mentioned pressure range, then the heat from the heating device 35 may be insufficient to induce the formation of a bubble 41 in the liquid 34 when the temperature of the heating device 35 is at the second temperature. Consequently, to ensure that the switch 50 operates only in response to the heating device 35, the pressure controlling mechanism 52 maintains the pressure in the chamber 54 in the above-mentioned pressure range.

Various methods and devices may be employed to control the pressure in the chamber 54. In the preferred embodiment, the pressure in the chamber 54 is controlled by controlling the temperature of a portion of the liquid 34. As shown by FIGS. 5 and 6, the chamber 54 of the preferred embodiment is comprised of two compartments 55 and 58 and a passageway 62. The passageway 62 extends from the compartment 55 to the compartment 58, and liquid 34 from either compartment 55 or 58 may flow through the passageway 62 to the other compartment 55 or 58.

In the configuration shown by FIG. 6, the pressure controlling mechanism 52 includes a heating device that generates heat to control the temperature of the liquid 34 in the compartment 58. The compartment 58 is partially filled with liquid 34 and partially filled with vapor, and the liquid 34 is in equilibrium with the vapor. As known in the art, the pressure of a two-phase liquid/vapor system in a sealed chamber varies proportionally to temperature. Therefore, by controlling the temperature in compartment 58, the pressure controlling mechanism 52 controls the pressure throughout the chamber 54.

Although it is desirable for the pressure controlling mechanism 52 to affect the temperature of the liquid 34 in compartment 58 so that the appropriate pressure range in the chamber 54 may be maintained, it is not generally desirable for the temperature of the liquid 34 in compartment 55 to be significantly affected by the pressure controlling mechanism 52. In this regard, changing the temperature of the liquid 34 affects the index of refraction of the liquid 34. Since the optical signals from segments 22–25 pass through the liquid 34 in compartment 55, it is desirable for the index of refraction of the liquid 34 in compartment 55 to be constant to minimize attenuation of the optical signals. Therefore, the temperature of the liquid 34 in compartment 55 should be kept constant to minimize variations in the index of refraction of the liquid 34 in compartment 55.

Separating the liquid 34 into two compartments 55 and 58, as shown by FIG. 6, helps to keep the temperature of the liquid 34 in compartment 55 constant. In this regard, the relatively small cross-sectional area of the passageway 62 impedes the transfer of heat between the liquid 34 in the two compartments 55 and 58. However, the passageway 62 communicates the pressure in compartment 58 to the entire chamber 54. Therefore, a change in the temperature of the liquid 34 in compartment 58 does not significantly affect the temperature of the liquid 34 in compartment 55 but quickly changes the pressure throughout chamber 54. Consequently, separating the chamber 54 into two compartments 55 and 58 helps to maintain the liquid 34 in compartment 55 at a constant temperature without significantly impairing the ability of the pressure controlling mechanism 52 to determine the pressure throughout the chamber 54.

It should be noted that the temperature of the liquid 34 is less affected by changes in the temperature of compartment 58 for smaller cross-sectional areas of the passageway 62. Therefore, the cross-sectional area of the passageway 62 should be as small as possible consistent with an ability to communicate a change in pressure between the two compartments 55 and 58.

Figure 7:
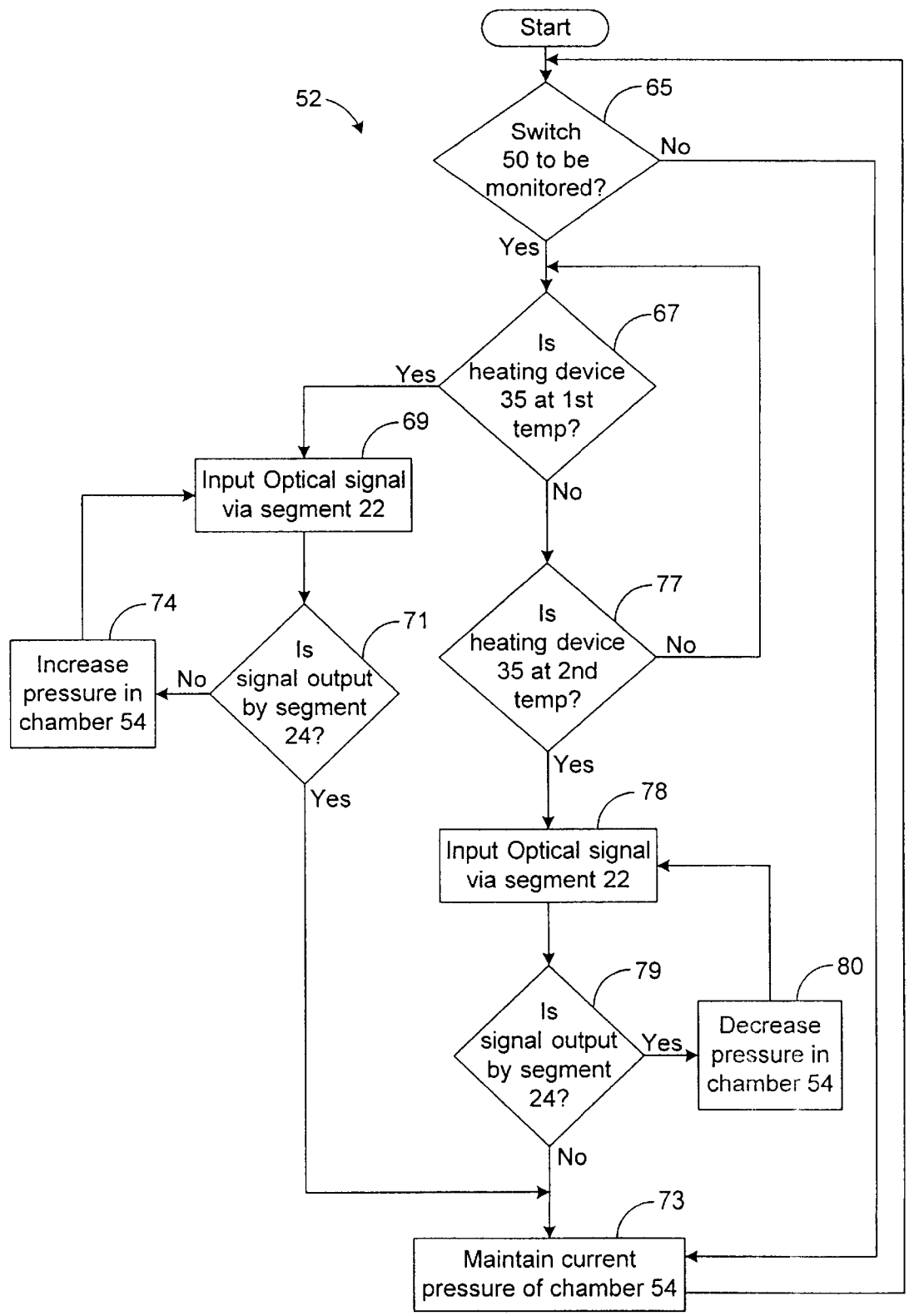
FIG. 7 is a flow chart depicting the architecture and functionality of the pressure controlling mechanism of FIG. 6.

FIG. 7 is a flow chart showing a method of operating the switch 50. In operation, the switch 50 can be monitored, as depicted by blocks 65 and 67 of FIG. 7, when the temperature of the heating device 35 is at the first temperature, which should be below the boiling point of the liquid 34. In this regard, a determination is made as to whether an optical signal input to the switch 50 via segment 22 is output via segment 24 or segment 23, as shown by blocks 69 and 71 of FIG. 7. If the signal is output via segment 24, then the pressure in the chamber 54 is sufficiently high, and the temperature of the liquid 34 in the compartment 58 does not need to be increased. Therefore, the pressure controlling mechanism 52 maintains the pressure in the chamber 54 by maintaining the temperature of the liquid 34 in compartment 58, as shown by block 73 of FIG. 7. However, if the optical signal is output via segment 23, then an inadvertent bubble 42 has formed in the liquid 34. In this case, the pressure in the chamber 54 should be increased to collapse the inadvertent bubble 42, as shown by block 74 of FIG. 7.

In implementing blocks 69, 71, and 74, the heat generated by the pressure controlling mechanism 52 is increased until the optical signals input to the switch 50 via segment 22 are output via segment 24. As the heat from the pressure controlling mechanism 52 increases the temperature of the liquid 34 in compartment 58, the pressure in the chamber 54 increases, and the size of the inadvertent bubble 42 collapses. Once the optical signals input via segment 22 are output via segment 24, the heat from the substrate 38 is not sufficient to significantly affect the operation of the switch 50, and further increasing the temperature of the compartment 58 is not necessary. Then, as shown by block 73 of FIG. 7, the pressure controlling mechanism 52 continues to heat the liquid 34 in the compartment 58, as necessary, to maintain the pressure in the compartment 55.

The switch 50 is also monitored, as depicted by block 77 of FIG. 7, when the temperature of the heating device 35 is at the second temperature, which should be above the boiling point of the liquid 34. When the temperature of the heating device 35 is at the second temperature, a bubble 41 should form in the chamber 54 due to the heat produced by the heating device 35. Therefore, optical signals input via segment 22 should be reflected at the interface of the bubble 41 and the end of segment 22, and the optical signals should, therefore, be output via segment 23. If the optical signals are in fact output via segment 23, then the pressure in the chamber 54 is low enough to allow the heating device 35 to produce a bubble 41. Therefore, the pressure controlling mechanism 52 maintains the pressure in the chamber 54 by maintaining the temperature of the liquid 34 in compartment 58, as shown by blocks 73, 78, and 79 of FIG. 7. However, if the optical signals are output via segment 24 instead, then the pressure in the chamber 54 is too high to allow the bubble 41 to form in response to the heat produced by the heating device 35. Therefore, the temperature of the compartment 58 is decreased by the pressure controlling mechanism 52 until the optical signals are output from the switch 50 via segment 24, as shown by blocks 78, 79, and 80 of FIG. 7.

In implementing blocks 78, 79, and 80, the heat generated by the pressure controlling mechanism 52 is decreased until the optical signals input to the switch 50 via segment 22 are no longer output via segment 24. As the reduction in heat from the pressure controlling mechanism 52 decreases the temperature of the liquid 34 in compartment 58, the pressure in the chamber 54 decreases, and the size of the bubble 41 induced by heat from the heating device 35 increases. Once the optical signals input via segment 22 are no longer output via segment 24 in block 79, the pressure in the chamber 54 is low enough to allow the bubble 41 to form, and further decreasing the temperature of the liquid 34 in the compartment 58 is not necessary. Then, as shown by block 73 of FIG. 7, the pressure controlling mechanism 52 continues to heat the liquid 34 in the compartment 58, as necessary, to maintain the temperature of the liquid 34 in the compartment 58.

Performing the foregoing monitoring and control ensures that the pressure in the chamber 54 is maintained in the appropriate pressure range. The monitoring and controlling may be repeated as desired to ensure that the switch 50 continues to operate solely in response to the heating device 35.

Figure 8:
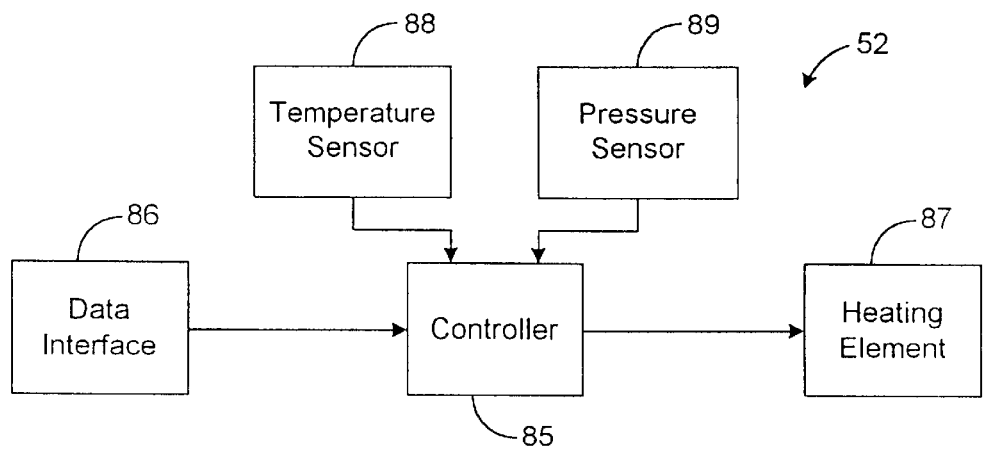
FIG. 8 is a block diagram illustrating the pressure controlling mechanism of FIG. 6.

To control the operation of the pressure controlling mechanism 52, the pressure controlling mechanism 52 preferably includes a controller 85, as shown by FIG. 8. In the preferred embodiment, the controller 85 is implemented in hardware, including electrical circuitry and/or mechanical components, but the controller 85 may also be implemented in software or a combination of hardware and software, if desired. The controller 85 receives notification signals from a data interface 86 indicating which segment 23 or 24 outputs the signals input to the switch 50 via segment 22. In the preferred embodiment, the data interface 86 includes sensors that detect whether light is traveling through segments 23 and 24 so that the notification signals can be automatically generated and transmitted to controller 85.

Based on the above-mentioned notification signals, the controller 85 determines whether the heat generated by the pressure controlling mechanism 52 should be increased or decreased in blocks 74 and 80 of FIG. 7 and transmits control signals to a heating element 87 to control the heat generated by the pressure controlling mechanism 52. As an example, the heating element 87 may be a resistor. To increase the amount of heat generated by the pressure controlling mechanism 52, the controller 85 applies a higher voltage to the heating element 87, and to decrease the amount of heat generated by the pressure controlling mechanism 52, the controller 85 applies a lower voltage to the heating element 87. Alternatively, the controller 85 may control the heating element 87 by other techniques such as by changing the duty cycle of a heating pulse transmitted to the heating element 87. The controller 85 may additionally receive inputs from a temperature sensor 88 and/or a pressure sensor 89 positioned in the chamber 54 to help it maintain the pressure in the chamber 54 in block 73 of FIG. 7.

Although the preferred embodiment comprises a chamber 54 having two compartments 55 and 58, it should be noted that any number (one or more) of compartments may be utilized in implementing the present invention. For example, the pressure controlling mechanism 52 may directly heat the liquid 34 in compartment 55, if desired, making compartment 58 and passageway 62 unnecessary. However, as previously described, it is generally desirable to minimally affect the temperature of the liquid 34 in compartment 55, and it is, therefore, desirable to heat the liquid 34 in compartment 58 according to the preferred embodiment.

Figure 9:
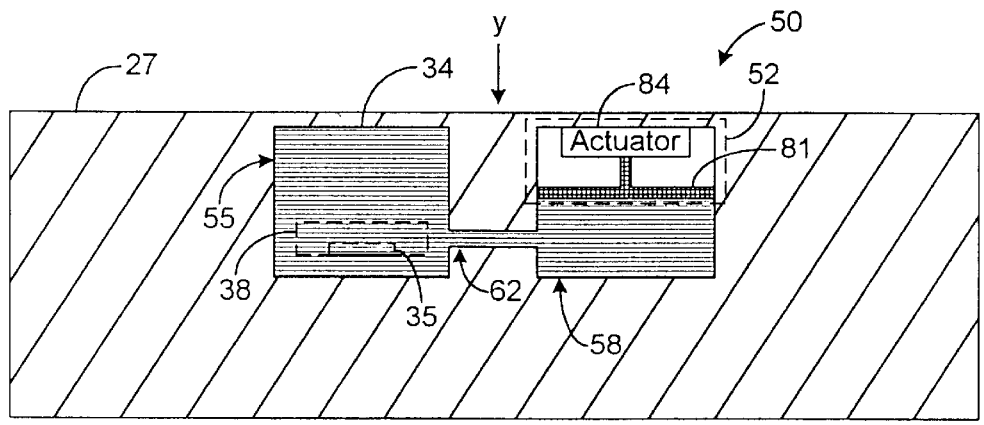
FIG. 9 is a cross-sectional view depicting the switch of FIG. 6 when the pressure controlling mechanism is comprised of an actuator and piston.

In addition, techniques other than heating the liquid 34 in the chamber 54 may be employed to control the pressure in chamber 54. For example, FIG. 9 depicts an embodiment where the pressure controlling mechanism 52 is comprised of a piston 81 and an actuator 84. To increase the pressure in the chamber 54, the actuator 84 moves the piston 81 in the y-direction, and to decrease the pressure in the chamber 54, the actuator 84 moves the piston 81 in the opposite direction. The operation of the embodiment shown by FIG. 9 is the same as the operation of the embodiment shown by FIG. 6, except that the pressure in the chamber 54 is controlled by moving the piston 81 instead of changing the temperature of the liquid 34.

Figure 10:
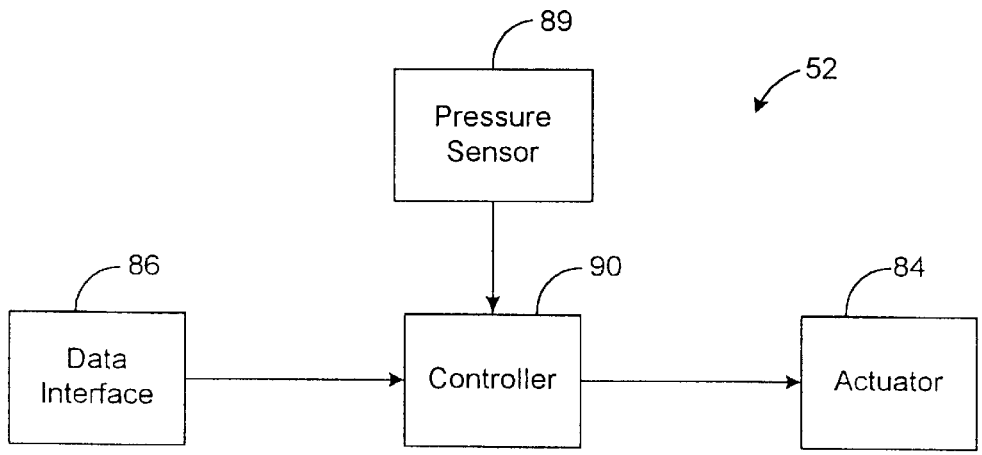
FIG. 10 is a block diagram illustrating the pressure controlling mechanism of FIG. 9.

As shown by FIG. 10, the actuator 84 is preferably coupled to a controller 90 that determines when and which direction the piston 81 should move to increase or decrease the pressure in chamber 54. Similar to controller 85 (FIG. 8), the controller 90 may receive inputs from the data interface 86 and/or pressure sensor 89 to determine that the pressure in chamber 54 needs to be increased or decreased. Furthermore, the controller 90 is preferably implemented in hardware, including electrical circuitry and/or mechanical components, but the controller 90 may also be implemented in software or a combination of hardware and software, if desired.

Figure 11:
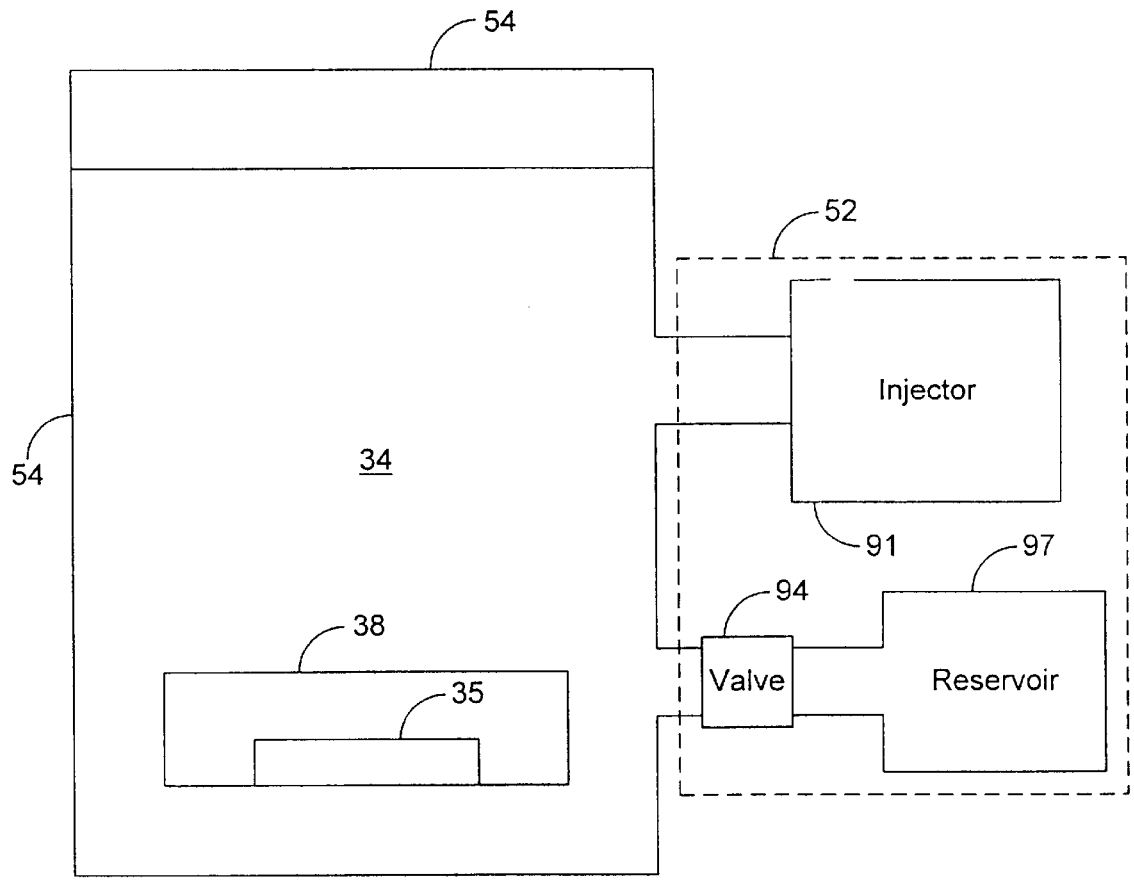
FIG. 11 is a side view depicting the chamber and the pressure controlling mechanism of FIG. 6 when the pressure controlling mechanism includes an injector.

In another embodiment as shown by FIG. 11, the pressure controlling mechanism 52 may be comprised of an injector 91 that increases the pressure in the chamber 54 by injecting a substance, such as liquid or vapor, into the sealed chamber 54. A release valve 94 may be used to decrease the pressure in the chamber 54 by allowing a portion of the liquid 34 or vapor in the chamber 54 to escape into reservoir 97. The operation of the embodiment shown by FIG. 11 is the same as the operation of the embodiment shown by FIG. 6, except that the pressure in the chamber 54 is controlled by respectively injecting and releasing a substance into and out of the chamber 54.

Figure 12:
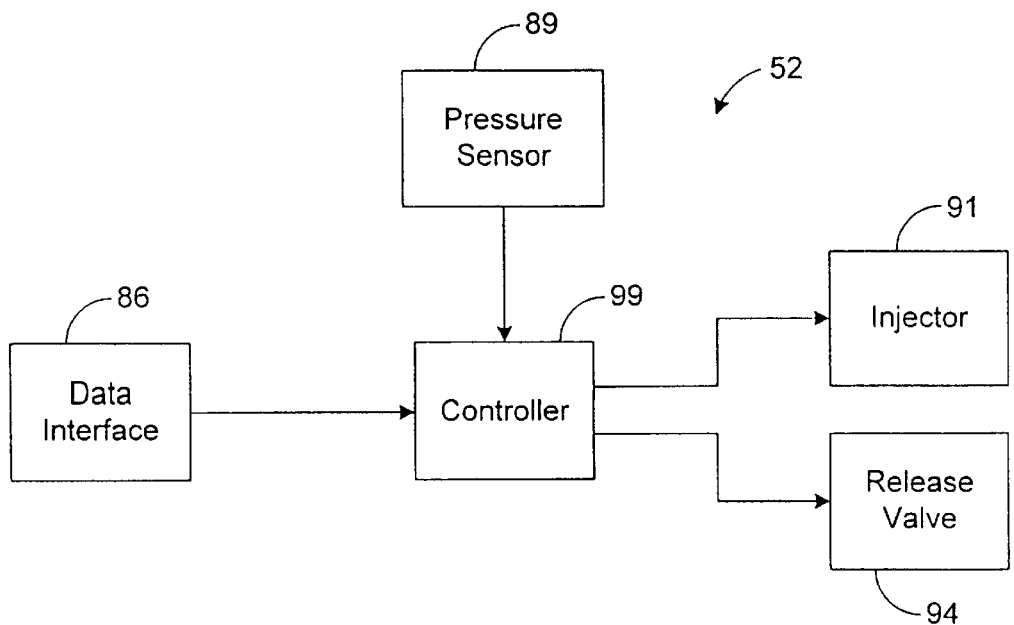
FIG. 12 is a block diagram illustrating the pressure controlling mechanism of FIG. 11.

As shown by FIG. 12, the pressure controlling mechanism 52 of the foregoing embodiment preferably includes a controller 99 to control the operation of the injector 91 and the release valve 94 and to determine when a substance should be injected into chamber 54 via injector 91 or when a substance should be released from chamber 54 via release valve 94. Similar to controller 85 (FIG. 8), the controller 99 may receive inputs from the data interface 86 and/or pressure sensor 89 to determine whether the pressure in chamber 54 needs to be increased or decreased. Furthermore, the controller 99 is preferably implemented in hardware, including electrical circuitry and/or mechanical components, but the controller 99 may also be implemented in software or a combination of hardware and software, if desired.

It should be noted that a plurality of switches 50 may be designed to utilize the same chamber 54 and pressure controlling mechanism 52, particularly when the switches 50 are employed in a switching network. Therefore, a plurality of heating devices 35 may reside in the chamber 54. In this situation, the formation of bubbles by other heating devices may affect the pressure in the chamber 54 and, therefore, affect the switching characteristics of the switch 50. However, by monitoring and maintaining the pressure of the chamber 54 in the appropriate range, as described above, the pressure controlling mechanism 52 compensates for the additional pressure induced by the formation of bubbles associated with other heating devices and/or substrates.

In the embodiments described above, the presence of a bubble 41 or 42 in the liquid 34 is detected by determining whether optical signals input via segment 22 are output via segment 23 or 24. However, other methods may be used for detecting the presence of a bubble 41 or 42, and any technique for detecting the presence of a bubble 41 or 42 in the liquid 34 may be employed in implementing the present invention.

It should be emphasized that the above-described embodiments of the present invention, particularly, any "preferred" embodiments, are merely possible examples of implementations for the invention. Many variations and modifications may be made to the above-described embodiment(s) All such modifications and variations are intended to be included herein in the scope of the present invention.

Now, therefore, the following is claimed:

1. An optical switch, comprising:

a first waveguide segment;

a second waveguide segment;

a substrate defining a chamber, said substrate coupled to said first and second waveguide segments, said chamber separating said first waveguide segment from said second waveguide segment;

a heating device located in said chamber at the intersection of said waveguide segments;

a liquid disposed in said chamber, said liquid being responsive to said heating device; and means for controlling pressure in said chamber.

2. The switch of claim 1, wherein said controlling means includes a means for receiving a notification signal and for adjusting said pressure based on said notification signal.

3. The switch of claim 1, wherein said controlling means comprises a piston.

4. The switch of claim 1, wherein said controlling means comprises an injector.

5. The switch of claim 1, wherein said heating device has a first temperature in a first state and has a second temperature in a second state, and wherein said controlling means maintains said pressure in a pressure range that sets the boiling point of said liquid to a temperature between said first temperature and said second temperature.

6. The switch of claim 1, wherein said controlling means comprises a heating element.

7. The switch of claim 6, wherein said chamber includes a first compartment and a second compartment with a passageway therebetween, and wherein said heating element heats said liquid in said second compartment to increase said pressure.

8. An optical switch, comprising:

a first waveguide segment;

a second waveguide segment;

a pressure controlling mechanism;

a substrate including a chamber associated with a pressure, said substrate coupled to said pressure controlling mechanism, said first waveguide segment, and second waveguide segment, said chamber separating said first waveguide segment from said second waveguide segment, said pressure being responsive to said pressure controlling mechanism;

a heating device located in said chamber at the intersection of said waveguide segments; and a liquid disposed in said chamber, said liquid being responsive to said heating device.

9. The switch of claim 8, wherein said pressure controlling mechanism receives a notification signal indicating that an optical signal transmitted by said first waveguide segment is received by said second waveguide segment and wherein said pressure controlling mechanism adjusts said pressure based on said notification signal.

10. The switch of claim 8, wherein said pressure controlling mechanism comprises a piston.

11. The switch of claim 8, wherein said pressure controlling mechanism comprises an injector.

12. The switch of claim 8, wherein said heating device has a first temperature in a first state and has a second temperature in a second state, and wherein said pressure controlling mechanism maintains said pressure in a pressure range that sets the boiling point of said liquid to a temperature between said first temperature and said second temperature.

13. The switch of claim 8, wherein said pressure controlling mechanism comprises a heating element.

14. The switch of claim 13, wherein said chamber is defined by a first compartment and a second compartment with a passageway therebetween.

15. A method for switching optical signals, the method comprising steps of:

providing a first waveguide segment, a second waveguide segment, and a third waveguide segment;

providing a substrate, said substrate including a chamber filled with a liquid, said chamber separating said first waveguide segment from said second waveguide segment;

providing a heating device;

transmitting an optical signal via said first waveguide segment; and adjusting a pressure in said chamber such that optical signals transmitted via said first waveguide segment pass through said chamber and into said second waveguide segment when a temperature of said heating device is at a first temperature and such that a bubble forms in said liquid to reflect optical signals transmitted via said first waveguide segment into said third waveguide segment only when said temperature of said heating device is raised above a second temperature.

16. The method of claim 15, wherein said adjusting step includes a step of injecting a substance into said chamber.

17. The method of claim 15, further comprising a step of providing a piston, wherein said adjusting step includes a step of moving said piston.

18. The method of claim 15, wherein said adjusting step includes a step of heating said liquid.

19. The method of claim 15, wherein said chamber is defined by a first compartment and a second compartment with a passageway therebetween, and wherein said adjusting step includes a step of heating said liquid in said second compartment.

\* \* \* \* \*